(12) United States Patent　　(10) Patent No.: US 9,397,856 B2
O'Connell et al.　　(45) Date of Patent: Jul. 19, 2016

(54) VIRTUAL TUNNEL NETWORK ROUTER

(75) Inventors: Martin O'Connell, West Islip, NY (US);
Anand Kameswaran, Ronkonkoma, NY (US)

(73) Assignee: CA, INC., New York, NY (US)

( * ) Notice: Subject to any disclaimer, the term of this patent is extended or adjusted under 35 U.S.C. 154(b) by 2332 days.

(21) Appl. No.: 11/602,389

(22) Filed: Nov. 21, 2006

(65) Prior Publication Data

US 2007/0130366 A1　　Jun. 7, 2007

Related U.S. Application Data

(60) Provisional application No. 60/741,460, filed on Dec. 2, 2005.

(51) Int. Cl.
*G06F 15/173*　　(2006.01)
*H04L 12/46*　　(2006.01)
*H04L 12/713*　　(2013.01)

(52) U.S. Cl.
CPC .......... *H04L 12/4633* (2013.01); *H04L 45/586* (2013.01)

(58) Field of Classification Search
USPC .......................................................... 709/238
See application file for complete search history.

(56) References Cited

U.S. PATENT DOCUMENTS

| 6,922,774 | B2 * | 7/2005 | Meushaw et al. ............. 713/151 |
| 7,281,039 | B1 * | 10/2007 | Salkewicz ..................... 709/223 |
| 7,568,236 | B2 * | 7/2009 | Gbadegesin et al. ........... 726/27 |
| 2002/0069369 | A1 * | 6/2002 | Tremain ........................ 713/201 |
| 2003/0145104 | A1 * | 7/2003 | Boden et al. .................. 709/238 |
| 2004/0255028 | A1 | 12/2004 | Chu et al. ...................... 709/227 |

* cited by examiner

*Primary Examiner* — Ryan Jakovac
(74) *Attorney, Agent, or Firm* — Pillsbury Winthrop Shaw Pittman LLP

(57) ABSTRACT

A virtual host computer is presented that includes a virtualization software platform, at least one virtual machine executed by the virtualization software platform, a private network segment configured to prevent communications with at least one external computer, a public network segment configured to facilitate communications with the at least one external computer, and a virtual routing module that is executed as a virtual image by the virtualization software platform. The virtual routing module is configured to communicate with the at least one virtual machine via the private network segment, communicate with the public network segment, and execute a tunneling layer to form a private virtual network segment between the at least one virtual machine and the at least one external computer.

3 Claims, 2 Drawing Sheets

VIRTUAL TUNNEL NETWORK ROUTER

PRIORITY INFORMATION

This application claims priority from U.S. Provisional Application No. 60/741,460, filed Dec. 2, 2005, the contents being herein incorporated by reference in its entirety.

BACKGROUND OF THE INVENTION

1. Field of the Invention

The present invention generally relates to computer systems and networks, and more particularly, to a virtual tunnel router module for use in a virtual computer network.

2. Description of the Related Art

General purpose computer systems are usually equipped with a operating system (OS) that is responsible for managing and controlling the systems' resources. In particular, OS software is typically configured to manage memory, control access to peripheral devices, execute software applications, create network connections, etc. However, at any instance, computer systems function with a single operating system so, for the most part, software applications associated with different operating systems cannot be concurrently executed on one computer system.

Given the need for enterprise-level networks to function and manage numerous resources and, sometimes disparate, applications, recent trends have developed towards virtualization technologies. Virtualization technologies include software that creates a virtual machine on a host computer in which each virtual machine instance can execute its own virtual or guest operating system. In turn, virtual operating systems enable diverse applications to run in isolated environments on a shared hardware platform. Virtual operating systems comprise a software layer that runs on a host computer platform and provides an abstraction of a complete computer system to higher-level software. In this manner, multiple virtual machines, with or without heterogeneous operating systems, are capable of running in isolation, side-by-side, on the same physical machine. In addition, each virtual machine has its own set of virtual hardware (e.g., RAM, CPU, NIC, etc.) upon which an operating system and applications are loaded. The operating system sees a consistent, normalized set of hardware regardless of the actual physical hardware components.

Virtual machine platforms, such as, for example, VMware, Inc. XEN, Microsoft Virtualization Server, Solaris Virtualization, and AIX virtualization, run on computers and include a common base portion and separate user portions, all of which run on a physical computer. The virtual machine (or guest) is configured in the separate user portions as a logical partition of physical resources of the computer. A guest operating system runs on each virtual machine, and the virtual machine appears to the guest operating system as a real computer. Many applications can run on each guest operating system and its virtual machine. Applications running on different virtual machines can communicate with each other through the common base portion.

With this said, virtual machine platforms are subject to certain limitations. For example, virtualization platforms are frequently used for deploying multiple sessions (i.e., clones) of software applications throughout a network. As indicated above, software applications typically run on a specific operating system thereby requiring a specific set of resources, such as, for example, supporting libraries, databases, management software, and software providing business functionality. However, while it may be easy to "clone" a software system in such virtualization systems, it is usually not possible to have "clones" participate on the same network due to identification and network addressing issues.

Other limitations of virtual machine operating systems arise in the sharing and exchange of virtual machine (guest) image content within and across networks. That is, networked computers typically contain less than 1 GB of memory, so performance begins to degrade as the number of guest images running on a physical machine increases. And, CPU-intensive guest images may further limit the number of guest sessions that run on a single physical machine. Also, for certain network configurations, splitting the guest images load by distributing and running copies of guest images across multiple host computers may vitiate the anonymity of the host computers and compromise security.

SUMMARY OF THE INVENTION

The principles of the present invention, as embodied and broadly described herein, provide a system and method that employ a virtual tunnel network router to establish a private virtual communication between at least one virtual machine and external computers. In one embodiment, a virtual host computer is presented that includes a virtualization software platform, at least one virtual machine executed by the virtualization software platform, a private network segment configured to prevent communications with at least one external computer, a public network segment configured to facilitate communications with the at least one external computer, and a virtual routing module that is executed as a virtual image by the virtualization software platform.

The virtual routing module may be configured to communicate with the at least one virtual machine via the private network segment, communicate with the public network segment, and execute a tunneling layer to form a private virtual network segment between the at least one virtual machine and the at least one external computer.

In another embodiment, a virtualized computer network is presented that includes a first host computer including a first virtualization platform, at least one virtual machine executed by the first virtualization platform, a first private network segment configured to prevent external communications, a first public network segment configured to facilitate external communications, and a first virtual routing module that is executed as a virtual image by the first virtualization software platform.

The virtualized computer network also includes a second host computer including a second virtualization platform, at least one virtual machine executed by the second virtualization platform, a second private network segment configured to prevent external communications, a second public network segment configured to facilitate external communications, and a second virtual routing module that is executed as a virtual image by the second virtualization software platform.

Accordingly, the first virtual routing module may be configured to: (i) communicate with the at least one virtual machine of the first host computer via the first private network segment; (ii) communicate with the at least one virtual machine of the second host computer via the first public network segment; and (iii) execute a first tunneling mechanism to form a private virtual network segment from the at least one virtual machine of the first host computer to the at least one virtual machine of the second host computer. Similarly, the second virtual routing module bay be configured to: (i) communicate with the at least one virtual machine of the second host computer via the second private network segment; (ii) communicate with the at least one virtual machine of the first host computer via the second public network segment; and (iii) execute a second tunneling mechanism to form a private virtual network segment from the at least one virtual machine of the second host computer to the at least one virtual machine of the first host computer.

In a further embodiment, a method of establishing a virtualized computer network is presented. The method includes executing a first virtualization platform on a first host computer, the first host computer including a first private network segment configured to prevent external communications and a first public network segment configured to facilitate external communications and initiating an instance of at least one virtual machine by the first virtualization platform. The method also includes executing a second virtualization platform on a second host computer, the second host computer including a second private network segment configured to prevent external communications and a second public network segment configured to facilitate external communications and initiating an instance at least one virtual machine by the second virtualization platform.

The method further includes deploying a first virtual routing module on the first host computer, the first virtual routing module being executed as a virtual image by the first virtualization software platform and deploying a second virtual routing module on the second host computer, the second virtual routing module being executed as a virtual image by the second virtualization software platform.

The method then configures the first virtual routing module to communicate with the at least one virtual machine of the first host computer via the first private network segment, communicate with the at least one virtual machine of the second host computer via the first public network segment, and execute a first tunneling mechanism to form a private virtual network segment from the at least one virtual machine of the first host computer to the at least one virtual machine of the second host computer.

Finally, the method configures the second virtual routing module to communicate with the at least one virtual machine of the second host computer via the second private network segment, communicate with the at least one virtual machine of the first host computer via the second public network segment, and execute a second tunneling mechanism to form a private virtual network segment from the at least one virtual machine of the second host computer to the at least one virtual machine of the first host computer.

BRIEF DESCRIPTION OF DRAWINGS

Embodiments of the invention will now be described, by way of example only, with reference to the accompanying schematic drawings in which corresponding reference symbols indicate corresponding parts, and in which.

DETAILED DESCRIPTION OF THE INVENTION

To overcome the limitations noted above, the present invention provides a virtual tunnel network router module that enables the deployment of multiple sessions of software applications and the sharing and exchange of guest image content within and across networks without appreciable performance degradation or security issues. The virtual tunnel network router (VTNR) is configured as a virtual image that establishes private virtual communications between the virtual guest machines and external computers. This is achieved by having the VTNR operate on the virtual hardware to set up a tunneling layer that connect all associated guests, operating on multiple hosts, including those across external networks, to form a private virtual network segment.

By way of review, virtualization software platforms, such as those identified above, are constructed and arranged to operationally divide a host computer, having a processor, memory, and physical system devices, and a conventional operating system, into a system level and a user level. The host computer accepts and carries out a pre-determined set of privileged instruction calls only from sub-systems at the system level. The software also includes at least one virtual machine monitor (VMM) that virtualizes the physical resources of the host computer and is installed to be co-resident with the host operating system at the system level.

In addition, the virtual machine operating system also include a set of virtual hardware that operatively connects to the host computer's physical hardware. The virtual hardware accepts commands stored in memory by the VMM via a driver and processes these commands.

It will be appreciated that virtual machine operating systems may be arranged to support both, private and public network communications. As such, virtual machine operating systems may include a public network segment and private network segment. The public network segment enables a virtual guest operating system to connect to an external network, via a local area network (LAN) coupled to the host computer, by connecting the virtual machine's virtual network adapter to the host computer's physical network adapter. On the other hand, the private network segment enables communications between virtual guest machines running on the same host computer.

Figure 1:
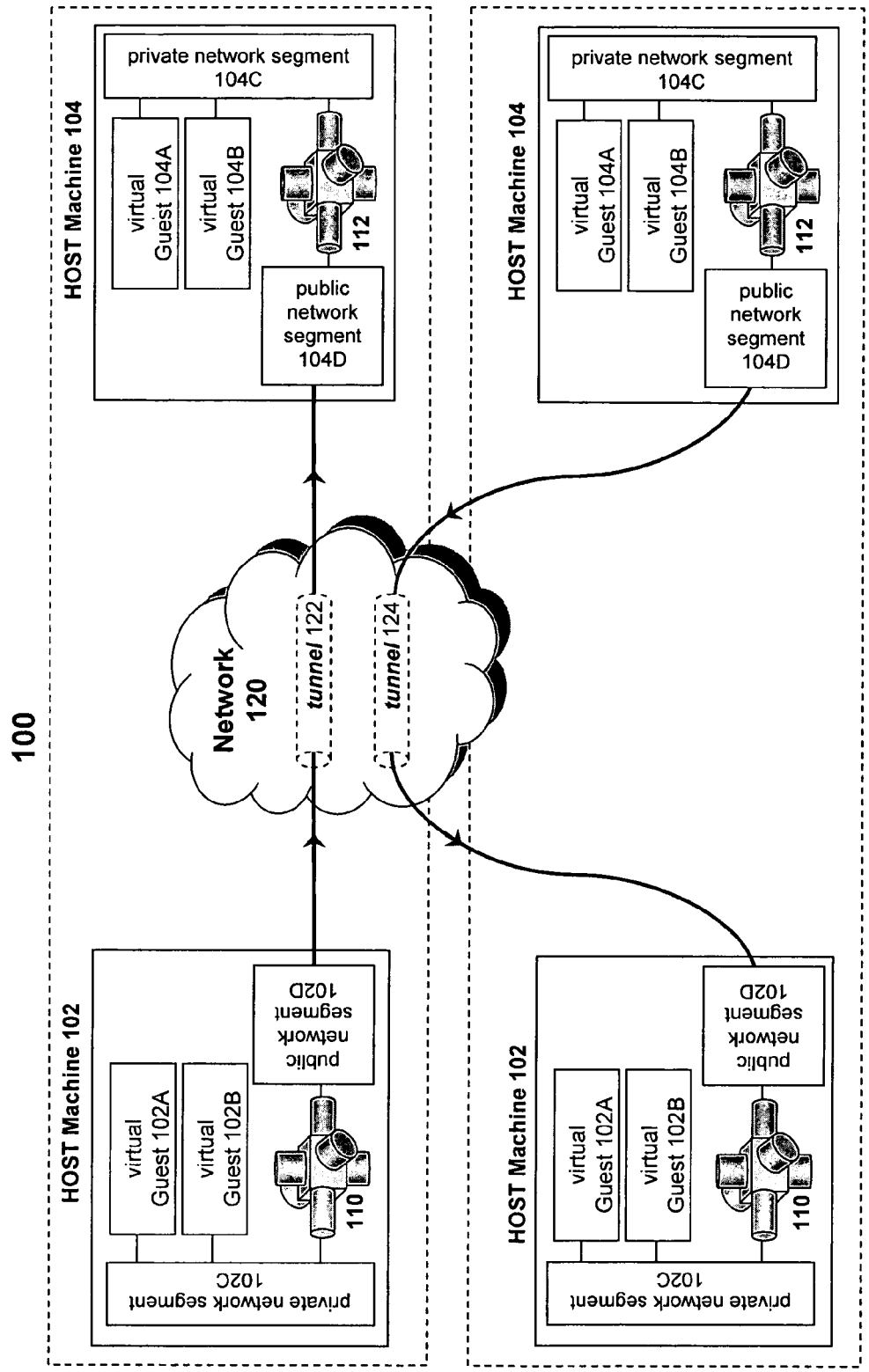
FIG. 1 schematically depicts a virtual network environment employing a virtual tunnel network router, in accordance with an embodiment of the invention.

FIG. 1 schematically depicts a virtual network environment 100 employing virtual tunnel network routers (VTNRs) 110, 112, in accordance with an embodiment of the invention. The virtual environment 100 comprises at least two host computers 102, 104, each configured to support one or more virtual machine or guest sessions 102A, 102B, 104A, 104B, respectively. That is, each of the at least two host computers 102, 104 are equipped with a processor, memory, and physical system devices, and a conventional operating system as well as the virtual software platform that provides the necessary abstraction to execute and support guest sessions 102A, 102B, 104A, 104B. As noted above, the virtual software platform includes at least one virtual machine monitor (VMM) that virtualizes the physical resources of the host computer and a device emulator accepts commands stored in memory by the VMM via a driver and processes these commands.

In addition, each of the virtual guests 102A, 102B, 104A, 104B is assigned a network address that is preferably a subnet, which is designated or reserved as non-routable.

Regarding communications, host computers 102 are configured to support internal communications between VTNR 110, and respective virtual guests 102A, 102B via the private network segment 102C. Similarly, internal communications between VTNR 112, and respective virtual guests 104A, 104B are also configured with private network segment 102C. As discussed above, the private network segments 102C, 104C are designed to ensure privacy between the guests 104A, 104B by preventing external communications with other computers via a public network 120.

By virtue of VTNRs 110, 112, host computers 102, 104 and virtual guests 102A, 102B, 104A, 104B may communicate externally, as depicted in FIG. 1. That is, for remote access across a network 120, VTNRs 110, 112 support external communications by directing traffic from the respective private segments 102C, 104C to the public segments 102D, 104D. As noted above, public network segments 102D, 104D enable virtual guests 102A, 102B, 104A, 104B to connect to an external network 120 by connecting the virtual guest's virtual network adapter to the host computer's 102, 104 physical network adapter.

VTNRs 110, 112 are embodied as software-based router modules that are executed as a virtual images on host computers 102, 104. These modules include code configured to acquire the VTNR's 110, 112 own network address identity as well as acquire existence of virtual machines and other routers and their respective network address identities. In addition, these modules include code configured to listen to the network traffic and route data packet traffic accordingly.

It will be appreciated that, for optimal network performance, VTNRs 110, 112 are configured with the intention of conserving the physical machine's resources, including memory. As such, the software modules associated with the functionality of VTNRs 110, 112 may, in some embodiments, comprise less than 15 MB of memory and occupy less than 250 MB of disk space.

VTNRs 110, 112 employ two different techniques for routing data packets to guests: tunnels and multi-homing/aliases. Data packets intended for guests on the same host computer, such as guests 102A, 102B of host computer 102, as depicted in FIG. 1, may be routed by placing each guest on a different subnet and multi-homing the router's host-only adapter. Multi-homing, in this context, refers to configuring the network adapter to listen on multiple network addresses. It will be appreciated that this may be accomplished via network interface card (NIC) aliasing. In one embodiment, the aliases are assigned a network address based on the network address of the guest machine.

As noted above, the host-only network configuration ensures privacy between the host computer 102 and guests 104A, 104B by preventing external communications with other computers. So, for communications between machines not hidden by a VTNR and a machine inside the VTNR environment, VTNRs 110, 112 may be equipped with port forwarding capabilities. Port forwarding enables the redirecting of data packets intended for a port of the public VNTR's address to a pre-specified port of a hidden machine within the network environment created by the VNTR, thereby ensuring further privacy.

With respect to communications between guests on different host computers, such as guest 102A of host computer 102 and guest 104A of host computer 104, as depicted in FIG. 1, VTNRs 110, 112 may be further equipped with tunneling layer capabilities.

Tunneling layers form the basis of cross-host communication and are generally accomplished by encapsulating the private network data and protocol information within public network transmission units, so that the private network protocol information appears to the public network as data. A commonly used tunneling protocol is generic routing encapsulation (GRE), developed by Cisco Systems.

Given the tunneling protocol, the tunnels achieved by VTNRs 110, 112 are created as software network devices or modules, such as, for example, NIC cards, but are configured to accommodate one-way, point-to-point traffic. In other words, for an environment employing two VTNRs 110, 112, as depicted in FIG. 1, two tunnels 122, 124 are created, one from VTNR 110 to VTNR 112 and the reverse, from VTNR 112 VTNR 110. As a result, for virtual environments employing a VTNRs, there will be n*(n−1) tunnels, where n is the number of VTNRs. In one embodiment, tunnels are named and assigned network addresses based on the host computer's position in the network topology.

VTNRs 110, 112 are also provided with the public and hidden network addresses of the source and the public and hidden network addresses of the destination. Armed with such addresses, tunnels 122, 124 are set up to connect all the distributed host computers 102, 104 and virtual guests 102A, 102B, 104A, 104B by accessing and merging the respective private network segments 102C, 104C to create a private virtual network segment. In this manner, multiple sessions (i.e., clones) of software applications may be deployed, concurrently or otherwise, throughout the private virtual network segment.

In addition, VTNRs 110, 112 may also be provided with commands to assist in administrative tasks. For example, in one embodiment, VTNRs 110, 112 may include a command that displays all network devices, tunnels network addresses, and aliases. Arguments associated with this command may be used to create, modify and delete network devices. Another command may display the current routing table with arguments to this command creating, modifying, and delete routes. Yet another command may be used to display the public network addresses associated with current tunnels in which arguments to this command create, modify and delete tunnels.

Figure 2:
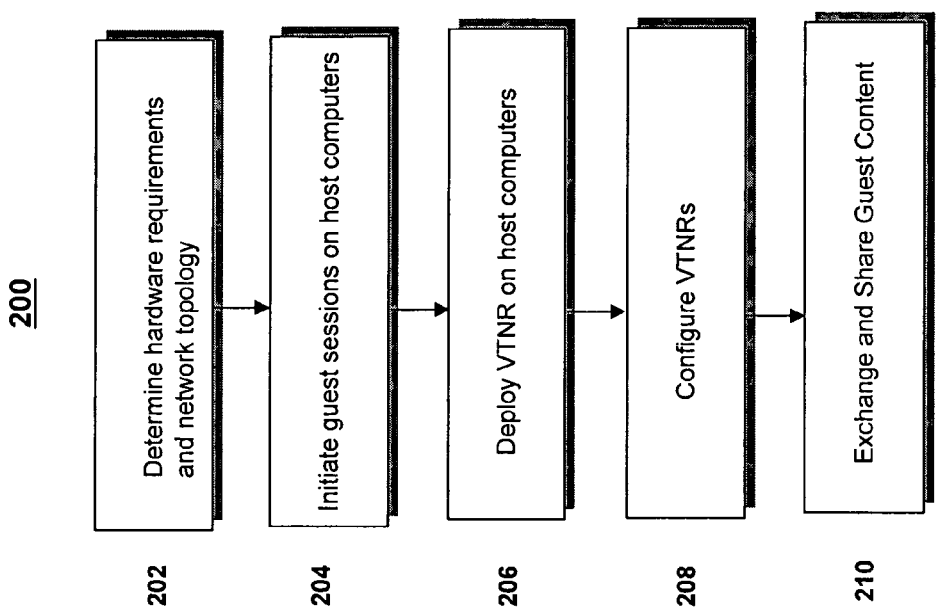
FIG. 2 depicts a flowchart for implementing a virtual tunnel network router in a virtual network environment, in accordance with an embodiment of the invention.

FIG. 2 illustrates a flowchart depicting method 200 for implementing a VTNR in a virtual network environment, in accordance with an embodiment of the invention. At block 202, an assessment is made regarding the intended virtual network environment and the required hardware features and configurations needed to achieve the intended functionality.

At block 204, the virtual guest sessions of the associated host computers are initiated. That is, each intended host computer executes the virtualization software application to create a guest session or instance on the host computer, including the assignment of virtual guest network addresses that are preferably a sub-net, designated or reserved as non-routable.

At block 206, the VTNRs are deployed on each of the associated host computers. As discussed above, the VTNRs are embodied as software-based routers with the features discussed above and are executed as a virtual images on host computers. As such, the deployment of the VTNRs may be achieved by executing the associated VTNR application software on the host computer. The deployment may also include the display of messages, such as indicating the VTNR's network address, the request for configuration information, receipt confirmation of configuration information, etc.

At block 208, the VTNRs are configured. The configuration of the VTNRs may include the use of initialization file that contains the configuration information needed for the VTNRs to operate in the intended virtual environment. The configuration information may include the network addresses designated to the VTNRs as well as network addresses of the guest machines. In addition, if cross-host communications or external remote access are anticipated, the configuration information may also include network addresses in which the network-facing port of the VTNR can forward all external remote communications to the host network adapter as well as network addresses for the tunnels.

By way of example, the configuration of the VTNRs may comprise the creation of the following devices:
 the network address of the network adapter that interfaces with the outside world and exists on all VTNRs;
 the first alias network address that is to be used as a gateway for the first virtual guest subnet;

the second alias network address that is to be used as a gateway for the second virtual guest subnet;

the tunnel device private address (the tunnel private addresses are distinct from the guests private addresses) and public network address; and a routing table with associated routes and both private and public network addresses.

It will be appreciated that the method of configuring each VTNR may be accomplished centrally, once the VTNRs are deployed on each of the associated host computers. That is, the configuration information may be contained in an initialization or configuration file and the file may then be distributed by executing a push function across the virtual environment that copies and loads the configuration information into each of the VTNRs.

After the VTNRs are configured, the guest image content may then be exchanged and shared, as indicated at block 210.

It will be clear to a person skilled in the art that the VTNRs may be implemented in a number of different network environments, platforms, and configurations including, but not limited to, wireless networks, direct connect configurations, shared hub configurations, within an enterprise network firewall, outside an enterprise network firewall, etc.

While specific embodiments of the invention have been described above, it will be appreciated that the invention may be practiced otherwise than as described. The description is not intended to limit the invention—rather the scope of the invention is defined by the appended claims.

What is claimed is:

1. A host computer, comprising:
   a virtualization software platform operating on the host computer;
   a virtual machine executed by the virtualization software platform, wherein the virtual machine comprises a network address that is on a subnet that is reserved as non-routable;
   a public network segment module operating on the host computer configured to facilitate communications with an external computer;
   a private network segment module operating on the host computer configured to communicate with the virtual machine, enable communications internal to the host computer, and prevent communications with the external computer; and
   a virtual routing module operating on the host computer that is executed as a virtual image by the virtualization software platform and is configured to:
   (a) communicate with the virtual machine via the private network segment module, wherein the virtual routing module is separate from the virtual machine;
   (b) direct data packets from the private network segment module to the public network segment module; and
   (c) execute a tunneling layer to merge the private network segment module of the host computer and an external private network segment module of the external computer to form a private virtual network segment between the virtual machine and the external computer,
   wherein the virtual router comprises a network address that is based on the network address of the virtual machine.

2. A computer network, comprising:
   a first host computer comprising a first virtualization platform operating on the first host computer, a first virtual machine executed by the first virtualization platform, a first private network segment module operating on the first host computer configured to communicate with the first virtual machine, enable communications internal to the first host computer and prevent external communications, a first public network segment module operating on the first host computer configured to facilitate external communications, and a first virtual routing module operating on the first host computer that is executed as a virtual image by the first virtualization software platform;
   a second host computer comprising a second virtualization platform operating on the second host computer, a second virtual machine executed by the second virtualization platform, a second private network segment module operating on the second host computer configured to communicate with the second virtual machine, enable communications internal to the second host computer and prevent external communications, a second public network segment module operating on the second host computer configured to facilitate external communications, and a second virtual routing module operating on the second host computer that is executed as a virtual image by the second virtualization software platform;
   (a) wherein the first virtual routing module is configured to:
   (i) communicate with the first virtual machine of the first host computer via the first private network segment module, wherein the first virtual routing module is separate from the first virtual machine;
   (ii) communicate with the second virtual machine of the second host computer via the first public network segment module; and
   (iii) execute a first tunneling mechanism to merge the first private network segment module and the second private network segment module to form a private virtual network segment from the first virtual machine of the first host computer to the second virtual machine of the second host computer; and (b) wherein the second virtual routing module is configured to:
   (i) communicate with the second virtual machine of the second host computer via the second private network segment module, wherein the second virtual routing module is separate from the second virtual machine;
   (ii) communicate with the first virtual machine of the first host computer via the second public network segment module; and
   (iii) execute a second tunneling mechanism to merge the second private network segment module and the first private network segment module to form a private virtual network segment from the second virtual machine of the second host computer to the first virtual machine of the first host computer,
   wherein the first and second virtual machines of the first and second host computers comprise network addresses that are on respective subnets that are reserved as non-routable, and
   wherein the first and second virtual routing modules comprise network addresses that are based on the respective first and second virtual machines of the first and second host computers.

3. A method of establishing a computer network, the method comprising:
   executing a first virtualization platform on a first host computer, the first host computer comprising a first private network segment module operating on the first host computer configured to enable communications internal to the first host computer and prevent external communications, and a first public network segment module operating on the first host computer configured to facilitate external communications;
   initiating an instance of a first virtual machine on the first host computer by the first virtualization platform, wherein the first private network segment module is further configured to communicate with the first virtual machine;

executing a second virtualization platform on a second host computer, the second host computer comprising a second private network segment module operating on the second host computer configured to enable communications internal to the second host computer and prevent external communications, and a second public network segment module configured operating on the second host computer to facilitate external communications;

initiating an instance of a second virtual machine on the second host computer by the second virtualization platform, wherein the second private network segment module is further configured to communicate with the second virtual machine;

deploying a first virtual routing module on the first host computer, the first virtual routing module being executed as a virtual image by the first virtualization software platform;

deploying a second virtual routing module on the second host computer, the second virtual routing module being executed as a virtual image by the second virtualization software platform;

configuring the first virtual routing module to communicate with the first virtual machine of the first host computer via the first private network segment module, wherein the first virtual routing module is separate from the first virtual machine, communicate with the second virtual machine of the second host computer via the first public network segment module, and execute a first tunneling mechanism to merge the first private network segment module and the second private network segment module to form a private virtual network segment from the first virtual machine of the first host computer to the second virtual machine of the second host computer;

configuring the second virtual routing module to communicate with the second virtual machine of the second host computer via the second private network segment module, wherein the second virtual routing module is separate from the second virtual machine, communicate with the first virtual machine of the first host computer via the second public network segment module, and execute a second tunneling mechanism to merge the second private network segment module and the first private network segment module to form a private virtual network segment from the second virtual machine of the second host computer to the first virtual machine of the first host computer;

assigning the first and second virtual machines of the first and second host computers to network addresses that are on respective subnets and are reserved as non-routable; and assigning the first and second virtual routing modules to network addresses that are based on the respective first and second virtual machines of the first and second host computers.

* * * * *